(12) United States Patent
Sanders et al.

(10) Patent No.: US 9,484,061 B2
(45) Date of Patent: Nov. 1, 2016

(54) AUTOMATICALLY CORRECTING AUDIO DATA

(75) Inventors: Eric Sanders, Lake Forest Park, WA (US); Charles Van Winkle, Seattle, WA (US); Daniel Ramirez, Seattle, WA (US); David E. Johnston, Duvall, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1366 days.

(21) Appl. No.: 11/877,544

(22) Filed: Oct. 23, 2007

(65) Prior Publication Data

US 2015/0205569 A1 Jul. 23, 2015

(51) Int. Cl.
| | |
|---|---|
| *G06F 17/00* | (2006.01) |
| *G11B 20/18* | (2006.01) |
| *G06F 3/16* | (2006.01) |
| *G10L 21/14* | (2013.01) |
| *G10L 21/0208* | (2013.01) |
| *G11B 27/031* | (2006.01) |

(52) U.S. Cl.
CPC ........... *G11B 20/1876* (2013.01); *G06F 3/165* (2013.01); *G10L 21/0208* (2013.01); *G10L 21/14* (2013.01); *G11B 27/031* (2013.01)

(58) Field of Classification Search
CPC ... G06F 3/165; G10L 21/14; G11B 20/1876; G11B 27/031
USPC ............ 700/94; 704/500–504; 386/285, 284; 381/61
See application file for complete search history.

(56) References Cited

U.S. PATENT DOCUMENTS

| | | | |
|---|---|---|---|
| 6,775,654 B1 * | 8/2004 | Yokoyama et al. .......... 704/500 |
| 2008/0041220 A1 * | 2/2008 | Foust et al. ..................... 84/625 |

* cited by examiner

*Primary Examiner* — Andrew C Flanders
(74) *Attorney, Agent, or Firm* — Shook, Hardy & Bacon L.L.P

(57) ABSTRACT

Systems, methods, and computer program products are provided for editing digital audio data. In some implementations a method is provided that includes receiving digital audio data, identifying a modification to a portion of the digital audio data, and automatically correcting audio data surrounding one or more edit boundaries resulting from the identified modification including interpolating audio data from a region associated with the one or more edit boundaries.

24 Claims, 8 Drawing Sheets

AUTOMATICALLY CORRECTING AUDIO DATA

BACKGROUND

This specification relates to editing digital audio data.

Different visual representations of audio data are commonly used to display different features of the audio data. For example, an amplitude display shows a representation of audio intensity in the time-domain (e.g., a graphical display with time on the x-axis and intensity on the y-axis). Similarly, a frequency spectrogram shows a representation of frequencies of the audio data in the time-domain (e.g., a graphical display with time on the x-axis and frequency on the y-axis).

The audio data can be edited. For example, the audio data may include noise or other unwanted audio data. Removing unwanted audio data improves audio quality (e.g., the removal of noise components provides a clearer audio signal). Alternatively, a user may apply different processing operations to portions of the audio data to generate particular audio effects.

SUMMARY

This specification describes technologies relating to editing digital audio data.

In general, one aspect of the subject matter described in this specification can be embodied in methods that include the actions of receiving digital audio data, identifying a modification to a portion of the digital audio data, and automatically correcting audio data surrounding one or more edit boundaries resulting from the identified modification including interpolating audio data from a region associated with the one or more edit boundaries. Other embodiments of this aspect include corresponding systems, apparatus, and computer program products.

These and other embodiments can optionally include one or more of the following features. Automatically correcting of the audio data can further include identifying the region including identifying a specified number of samples prior to a first edit boundary a specified number of samples after the first edit boundary, identifying a plurality of frequency bands in the region, and interpolating across the region for each individual frequency band.

Interpolating a first frequency band can include identifying one or more first amplitude values associated with the audio data in the samples prior to the first edit boundary and that correspond to the first frequency band, identifying one or more second amplitude values associated with the audio data in the samples prior to the first edit boundary and that correspond to the first frequency band, and interpolating across the region of the audio data at that frequency band using the first amplitude and the second amplitude values.

Interpolating a first frequency band can include identifying one or more first phase values associated with the audio data in the samples prior to the first edit boundary and that correspond to the first frequency band, identifying one or more second phase values associated with the audio data in the samples prior to the first edit boundary and that correspond to the first frequency band, and interpolating across the region of the audio data at that frequency band using the first phase and the second phase values.

Identifying a modification to a portion of the digital audio data can include determining when an editing effect is applied to the audio data. Identifying a modification to a portion of the digital audio data can include identifying a discontinuity in the audio data. The aspect can further include storing the corrected audio data.

Particular embodiments of the subject matter described in this specification can be implemented to realize one or more of the following advantages. Correcting audio data following modifications (e.g., from applying editing effects) improves audio quality including removing undesirable noise caused by discontinuities at edit boundaries of the audio data. Interpolating values of audio data for particular frequency bands provides a smoother transition across edit boundaries than cross-fading provided by mixing audio data on each side of an edit boundary. Interpolating audio data using phase information further improves the transition of audio data across edit boundaries. Using interpolation to correct audio data generally only requires a small amount audio data on each side of an edit boundary. Automatically correcting audio data simplifies user editing over manual correction.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
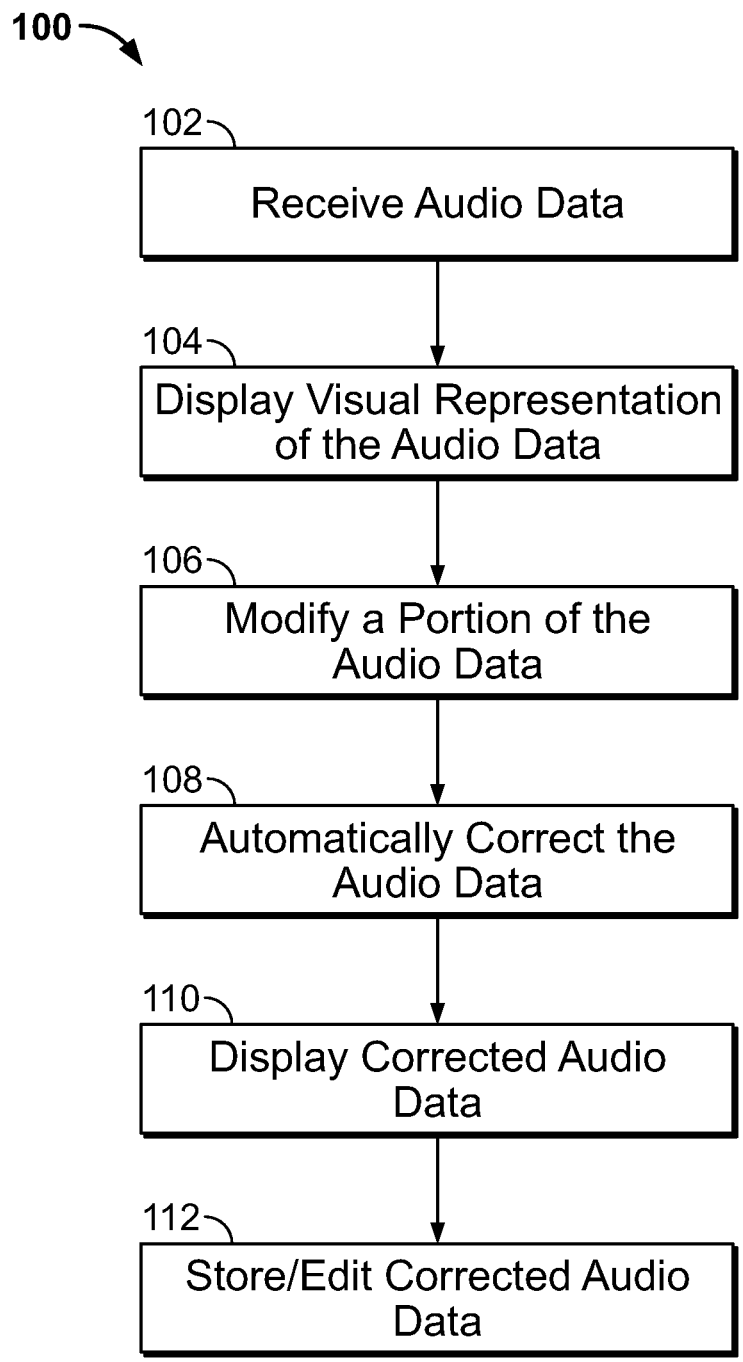
FIG. 1 shows a flowchart of an example method for automatically correcting audio data.

FIG. 1 shows a flowchart of an example method 100 for automatically correcting audio data. For convenience, the method 100 is described with respect to a system that performs the method 100. The system receives 102 digital audio data. The audio data is received, for example, as part of an audio file (e.g., a WAV, MP3, or other audio file). The audio file can be locally stored or retrieved from a remote location. The audio data can be received, for example, in response to a user selection of a particular audio file.

The system displays 104 a visual representation of the audio data. For example, a particular feature of the audio data can be plotted and displayed in a window of a graphical user interface. The visual representation can be selected to show a number of different features of the audio data. In some implementations, the visual representation displays a feature of the audio data on a feature axis and time on a time axis. For example, visual representations can include a frequency spectrogram, an amplitude waveform, a pan position display, or a phase display.

In some implementations, the visual representation is a frequency spectrogram. The frequency spectrogram shows audio frequency in the time-domain (e.g., a graphical display with time on the x-axis and frequency on the y-axis). Additionally, the frequency spectrogram can show intensity of the audio data for particular frequencies and times using, for example, color or brightness variations in the displayed audio data. In some alternative implementations, the color or brightness can be used to indicate another feature of the audio data e.g., pan position. In another implementation, the visual representation is an amplitude waveform. The amplitude waveform shows audio intensity in the time-domain (e.g., a graphical display with time on the x-axis and intensity on the y-axis).

In other implementations, the visual representation is a pan position or phase display. The pan position display shows audio pan position (i.e., left and right spatial position) in the time-domain (e.g., a graphical display with time on the x-axis and pan position on the y-axis). The phase display shows the phase of audio data at a given time. Additionally, the pan position or phase display can indicate another audio feature (e.g., using color or brightness) including intensity and frequency.

Figure 2:
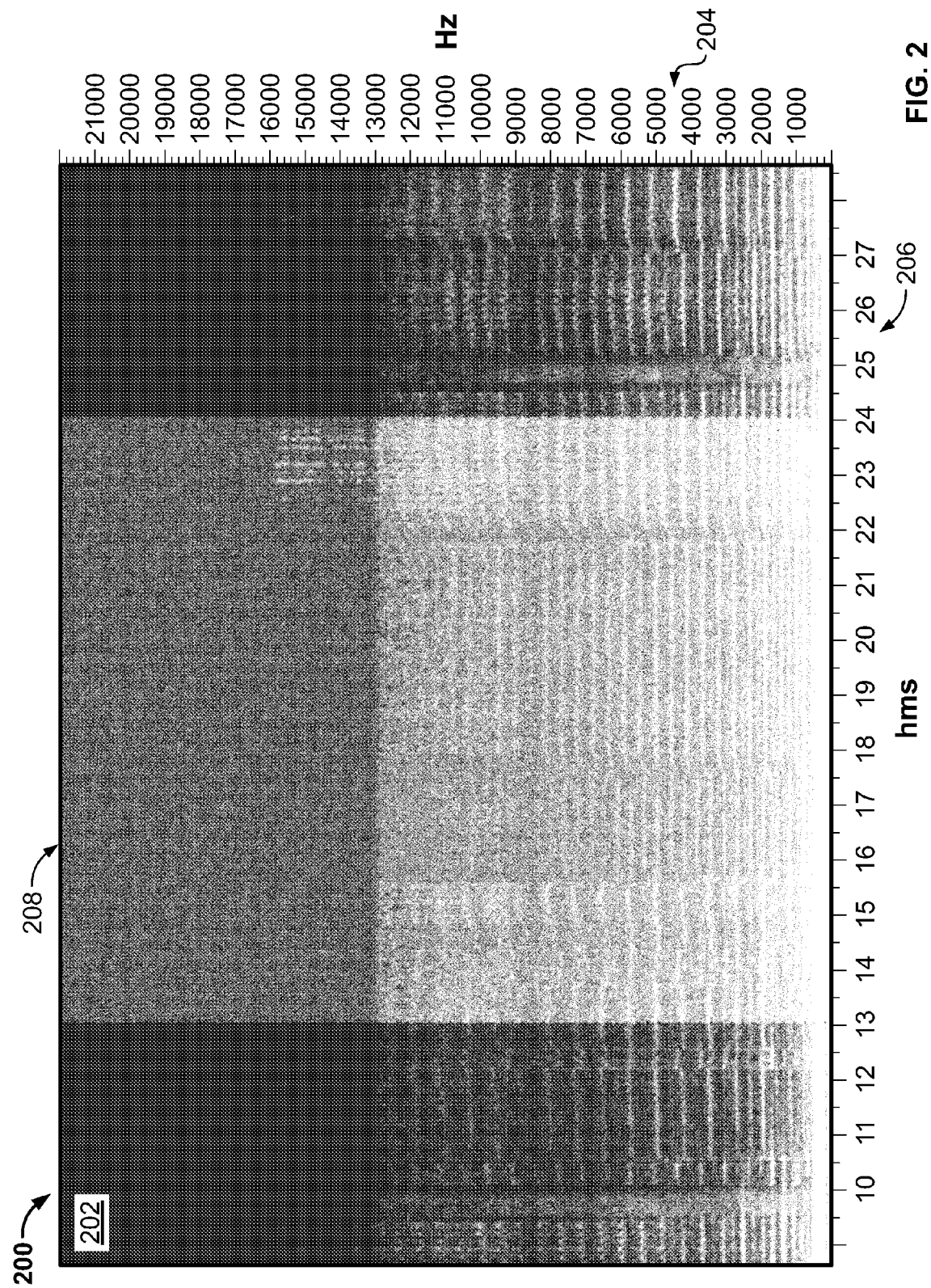
FIG. 2 shows a display of an example frequency spectrogram representation of audio data.

FIG. 2 is an example display 200 of a frequency spectrogram 202 representation of audio data. The display 200 shows frequency on the y-axis 204 in Hz and time on the x-axis 206 in seconds. The frequency spectrogram 202 shows spectral lines indicating the frequency of audio data with respect to time. In some implementations, not shown, the spectral lines of the frequency spectrogram 202 are colored or otherwise indicate (e.g., according to brightness) another audio feature (e.g., intensity of the audio data at that frequency and time).

As shown in FIG. 1, the system modifies 106 a portion of the audio data. The portion of the audio data modified can be a specified portion of the audio data or the whole audio data. The modification can be any change to the source audio data, for example, as a result of applying a particular editing effect to some or all of the audio data.

The system can modify audio data in response to a user input. For example, the system can receive a selection of audio data using a tool (e.g., a selection or an editing tool). In particular, a user can interact with the displayed visual representation of the audio data using a tool in order to identify a particular selection of the audio data (e.g., a selected portion of audio data). The tool can be, for example, a selection cursor, a tool for forming a geometric shape, or a brush similar to brush tools found in graphical editing applications. In some implementations, a user selects a particular tool from a menu or toolbar including several different selectable tools. In some implementations, particular brushes also provide specific editing functions. The user can then specify a particular action, for example one or more editing effects, to apply to the selected audio data. Examples of editing effects can include inserting, deleting, or filtering the audio data as well as compression, gain, or other equalization effects applied to the selected audio data.

In FIG. 2, a selected portion 208 is shown. The selected portion 208 is shown as a rectangular portion selected, for example, according to a user input. In frequency spectrogram 202, the selected portion 208 includes all audio data from time 13 seconds to time 24 seconds. For example, a user can use a cursor to select a particular portion of the displayed frequency spectrogram 202 corresponding to particular audio data represented by the selected portion 208 of the frequency spectrogram 202. The selected portion 208 can be illustrated within the frequency spectrogram 202, for example, using particular shading, outline, or other identifier or combination of identifiers. The user can identify an editing operation to be applied to the audio data within the selected portion 208. For example, after selecting the selected portion 208, the user can use a particular menu to identify an editing operation to perform. The identified editing operation, for example, can include deleting the audio data corresponding to the selected portion 208.

Figure 3:
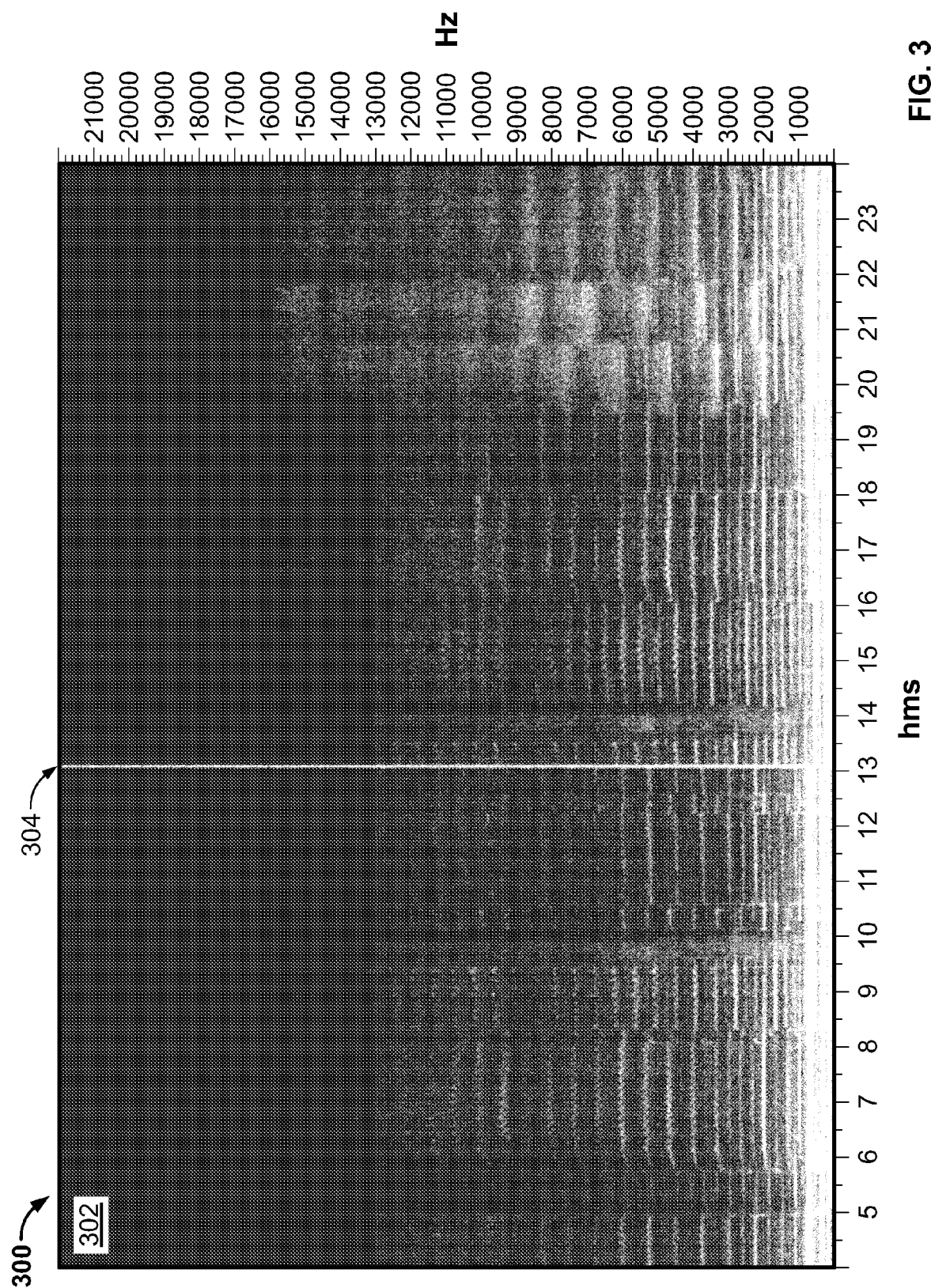
FIG. 3 shows a display of an example frequency spectrogram representation of edited audio data.

FIG. 3 shows a display 300 of an example frequency spectrogram 302 of edited audio data. In particular, the frequency spectrogram 302 corresponds to the audio data shown by frequency spectrogram 202 in which the selected portion 208 has been deleted. A line 304 identifies an edit boundary from the audio data occurring before the selected region and the audio data occurring after the selected portion, which has now been brought together because of the deletion. The edit boundary identifies where the audio data has been modified relative to other audio data.

In some implementations, the application of the editing effect to the audio data results in a modification of the audio data resulting in one or more discontinuities at one or more edit boundaries. For example, when removing audio data, a discontinuity can be formed between the audio data preceding the removed audio data and the audio data following the removed audio data. Alternatively, when inserting audio data, a discontinuity can be formed at the edit boundaries at each edge of the inserted audio data. These discontinuities can negatively impact the quality of the audio playback. In particular, even a minor discontinuity at an edit boundary can be perceived by a listener as a loud click in the audio data because of the way in which the ear discriminates frequencies.

Figure 4:
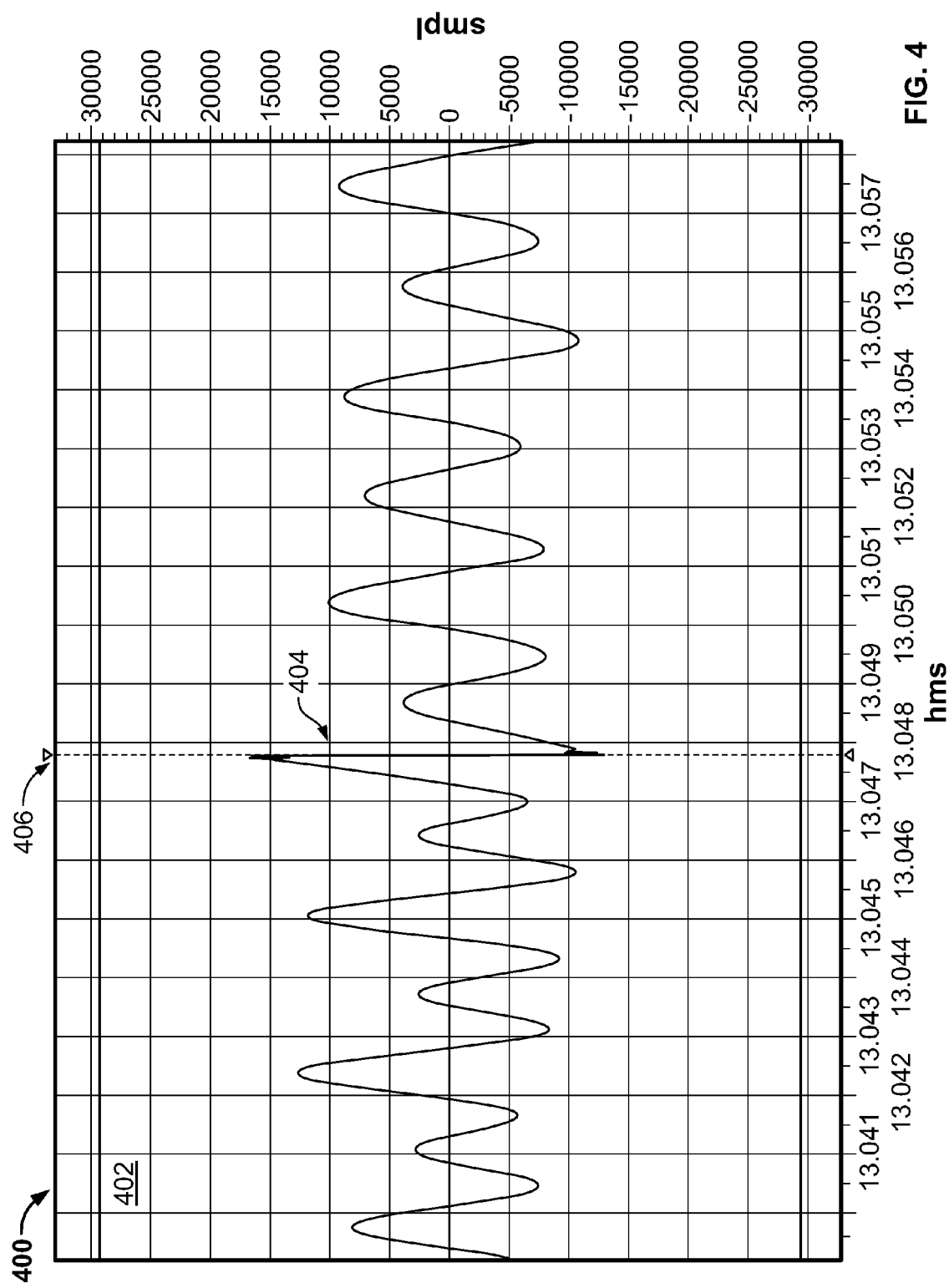
FIG. 4 shows a display of an example waveform representation of uncorrected edited audio data.

FIG. 4 shows a display 400 of an example waveform 402 of uncorrected edited audio data. Waveform 402 shows a discontinuity 404 at edit boundary 406. The discontinuity 404 shows a waveform prior to a modification (e.g., prior to a deletion) and following the modification (e.g., after the deletion). The discontinuity 404 demonstrates how the waveform 402 does not smoothly transition across the audio data one each side of an edit boundary, for example edit boundary 406 caused by the deletion of audio data. The discontinuity can detrimentally impact the sound quality of the audio data when played, for example, resulting in a click noise.

As shown in FIG. 1, the system automatically corrects 108 the audio data. In particular, when a modification to the audio data is detected, the system automatically performs a correction (also referred to as healing) operation on the audio data to smooth transitions from audio data on each side of one or more edit boundaries associated with the detected modification.

Figure 5:
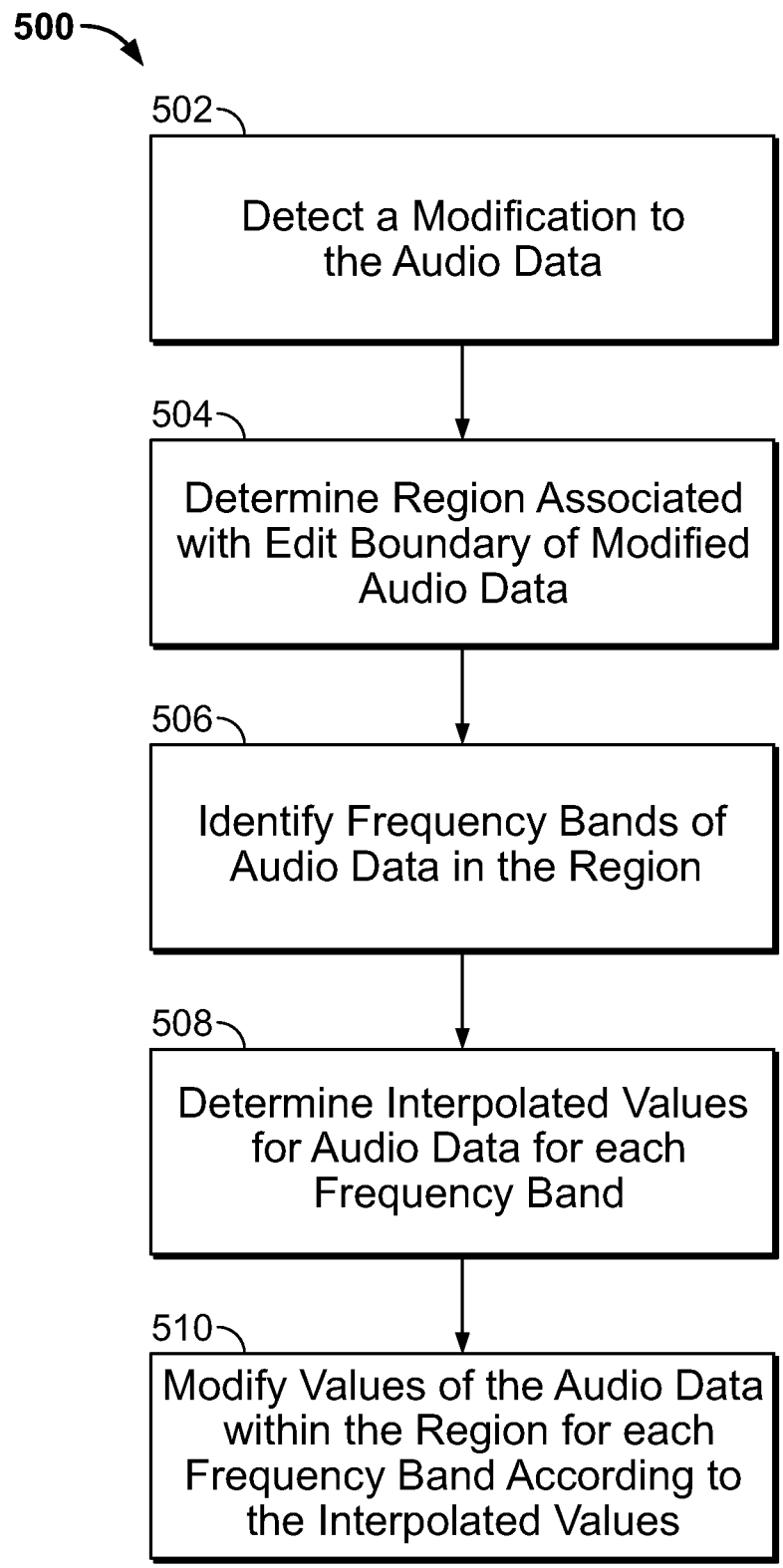
FIG. 5 shows a flowchart of an example method of applying healing to audio data.

FIG. 5 is a flowchart of an example method 500 for automatically applying a correction to selected audio data. For convenience, the method 500 is described with respect to a system that performs the method 500. The system identifies 502 a modification to the audio data. For example, the system can determine when a change to the source audio data occurs and automatically apply the correction to a region associated with each edit boundary resulting from the identified modification. Alternatively, in some implementations, the system determines whether or not a discontinuity has resulted at an edit boundary from the modification and only performs the correction when a discontinuity in the audio data occurs.

The system determines 504 a bounding region associated with one or more edit boundaries of the modified audio data. In some implementations, the system determines a bounding region as a rectangle having a width specified by a number of samples before and after each identified edit boundary and a height encompassing all of the audio data. For example, if the audio is represented as a frequency spectrogram, the bounding region encompasses audio data before and after the edit boundary for all frequencies. Alternatively, the bounding region can vary depending on the extent of the modified audio data. For example, if the modification results from a filter applied to particular frequencies of the audio data for a particular period of time, then the bounding region can be a rectangle having a height corresponding to the range of frequencies included in the filtering.

In some implementations, the number of samples before and after the edit boundary is specified (e.g., 400 samples on each side of the edit boundary). The number of samples can be specified according to default system values or previously entered values specified by the user. For example, the system can identify the bounding region as including audio data within 400 samples before the edit boundary and 400 samples after the edit boundary. If the sample rate is 44 kHz, the sample interval is substantially 1/44,000 seconds. Therefore, the audio data identified for the bounding region is the audio data occurring within 1/440 seconds of each side of the edit boundary.

In some alternative implementations, the edit boundary is not a vertical line of constant time, but instead can vary with frequency and time. In that case, the audio data is can bounded by a polygon, a plurality of polygons according to frequency bands, or other shapes that provides a closer fit to the selected audio data. Thus, for example, if the edit boundary is diagonally positioned with respect to the display axes of the frequency spectrogram, the bounding region associated with the edit boundary can vary in time by frequency band. Alternatively, in other implementations, the system uses audio data from a specified number of samples before and after the edit boundary with respect to each frequency band. Thus, the system can use audio data closer to the edit boundary than when using a rectangular bounding region.

For example, in the example described above with respect to FIG. 3, the system determines a bounding region with respect to the edit boundary 304 resulting from the deleted audio data. In particular, a specified number of samples are identified before the edit boundary and after the edit boundary across all frequencies. For example, for audio data deleted at time 13 seconds, a discontinuity occurs at time 13 seconds between the audio data on each side of the deletion. The system determines the bounding region as including a specified number of samples on each side of the edit boundary (e.g., on each side of time 13 seconds).

In an alternative example, if audio data was inserted, the system determines a bounding region with respect to each edge of the inserted audio data. Thus, if a ten second audio data were inserted at time 5 seconds, then two bounding regions would be identified because there are two edit boundaries: where the original audio transitions to the inserted audio data at time 5 seconds and where the inserted audio transitions back to the original audio data at time 15 seconds. If each bounding region includes 400 samples on each side of the respective edit boundary, then the first bounding region includes 400 samples on each side of time 5 seconds and the second bounding region includes 400 samples on each side of time 15 seconds defining the width of each bounding region, each bounding region encompassing all audio data within the that time period.

In another example, the modified audio data is a result of a filter effect being applied to a specified frequency range over a specified time. For example, a filter effect applied to audio data from 5 to 10 seconds at frequencies from 1000 Hz to 5000 Hz. The system can determine a bounding region bounded by a specified number of samples on each side of the filter beginning and ending times (e.g., edit boundaries at around 5 and 10 seconds). In addition, the bounding region can be bounded by just the frequency range of the audio data included in the filtering effect (i.e., from 1000 Hz to 5000 Hz). Thus, the bounding region is not necessarily across all audio data, just the audio data associated with the edit boundaries resulting from the modified audio data.

The system identifies 506 frequency bands within the bounded region of audio data. For example, for a selected region of a frequency spectrogram, the frequency bands are identified according to the range of frequencies bounded by the bounding region (e.g., the y-axis height of the bounding rectangle). The height of each frequency band can be specified by default system settings or specified according to a user input. For example, in some implementations, each frequency band has a height of 1000 Hz. In some implementations, the frequency is displayed according to a log scale and the height of the frequency bands are adjusted accordingly.

The system identifies the intensity (i.e., amplitude) values of the audio data within the audio data samples on each side of the discontinuity for each frequency band. For example, for a first frequency band having a range from 0-100 Hz, the system identifies the intensity over the 400 samples prior to edit boundary and the 400 samples following the edit boundary. The system can use, for example, Fourier Transforms to separate out the frequencies of each band in order to identify the intensity of the audio data within the band for a number of points within the 400 samples on each side of the edit boundary. In some implementations, the system determines the average intensity within the samples before and after the discontinuity for each frequency band.

The system determines 508 interpolated values for audio data in each frequency band. In some implementations, a linear interpolation is determined from the intensity values of the samples before and after the edit boundary fore each frequency band. For example, if the intensity of a first frequency band is −20 dB for audio data in the samples before the discontinuity and −10 dB for audio data in the samples following the discontinuity, the system determines interpolated intensity values from −20 dB to −10 dB linearly across the audio data of the first frequency band within the bounded region. In other implementations, different interpolation methodologies can be applied. The interpolation can be used to provide a smooth transition of intensity for audio data from one side of the bounded region to the other for each individual frequency band. For example, the interpolation can provide a smooth transition across an edit boundary discontinuity in the audio data resulting from application of a particular editing effect.

The system modifies 510 values of audio data within the bounded region for each frequency band according to the interpolated values. For audio data within the bounded region, the intensity values at each point in time are modified to correspond to the determined interpolated intensity values. This is performed for each frequency band such that the overall result provides a smooth transition of all the audio data within the bounded region, removing or reducing the discontinuity. In some implementations, the region of audio data, including the interpolated values, is pasted over the previous audio data in order to replace the audio data with the corresponding interpolated audio data.

In some implementations, the system interpolates phase values instead of, or in addition to, intensity values. For example, the phase values for the samples before and after the edit boundary of each frequency band can be interpolated across the edit boundary to provide a smooth transition. The phase values can be obtained using a Fourier Transform as described above to separate the audio data according to frequency and determining the corresponding phase values of the separated audio data. Additionally, in some implementations, both intensity and phase values are interpolated. In some implementations, a larger number of samples are used to interpolating phase values than the number of samples used to interpolate intensity values. For example, the system can identify 4000 samples on each side of the edit boundary instead of 400. The larger number of samples provides a smoother phase transition across the edit boundary.

As shown in FIG. 1, the system optionally displays 110 the corrected audio data. The display of the audio data, for example as a frequency spectrogram, can be updated to reflect the changes in the audio data as a result of the applied editing effect with the applied automatic correction at the edit boundaries of the modified audio data. In some implementations, the system automatically updates the displayed audio data following application of an editing effect that changes the audio data and subsequent correction. Alternatively, in some implementations, the user initiates an updated display, for example, by making a particular selection within the interface associated with the displayed audio data.

Additionally, the system optionally stores 112 the corrected audio data or makes the corrected audio data available for further editing operations. For example, the system can store the modified and corrected audio data in computer-readable or machine readable memory, either locally or remotely, as a separate audio file. Additionally or alternatively, the user can apply other editing effects to the modified audio data. For example, the user can apply an effect using the same or a different editing tool. Alternatively, the user can apply editing effects using other tools.

Figure 6:
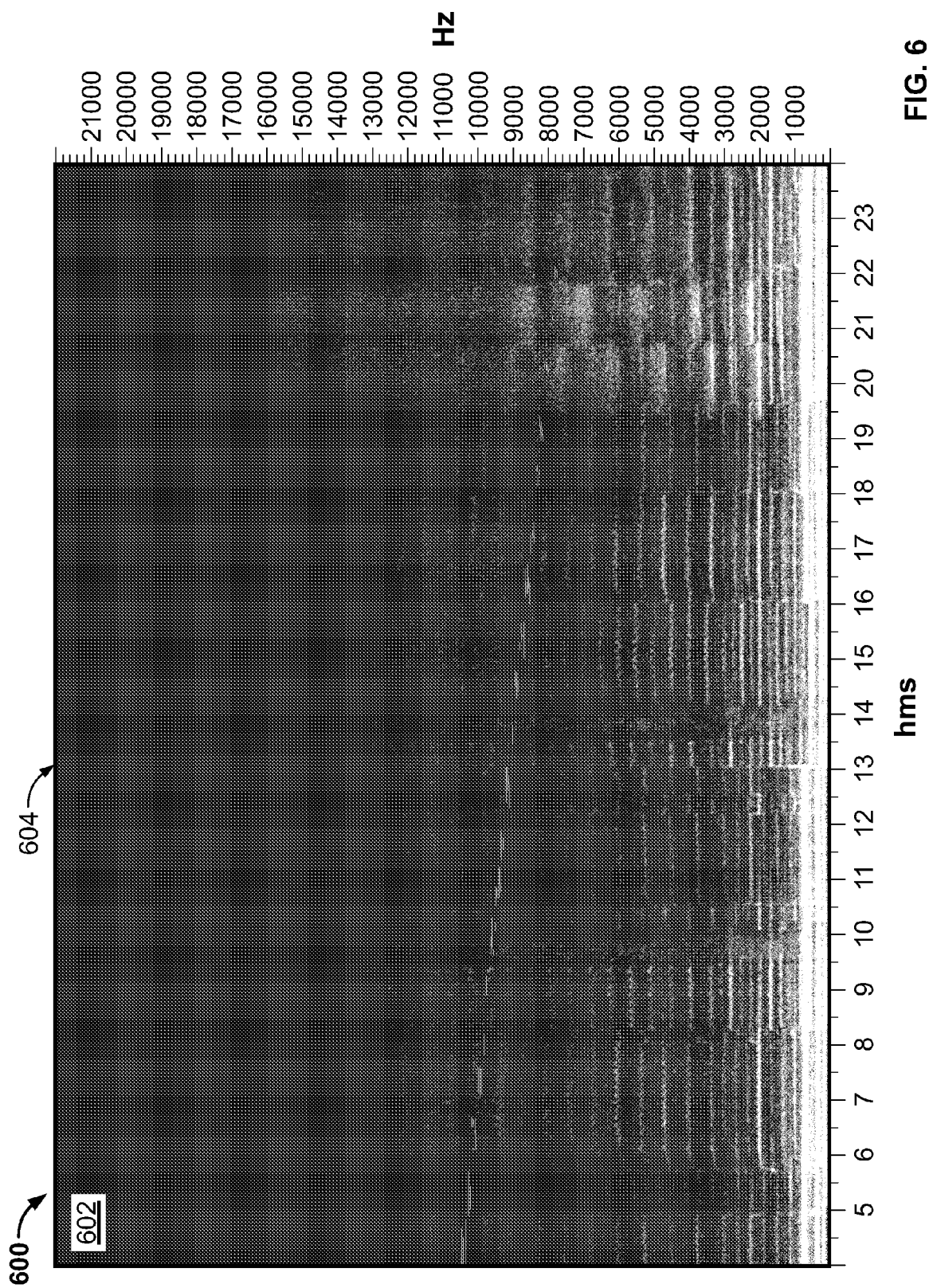
FIG. 6 shows a display of an example frequency spectrogram representation of corrected audio data.

FIG. 6 shows a display 600 of an example frequency spectrogram 602 representation of corrected audio data. In frequency spectrogram 602, the system has smoothed the transition between audio data one each side of an edit boundary 604 (e.g., smoothing the audio data at the edit boundary shown in FIG. 3 caused by deleting audio data).

Figure 7:
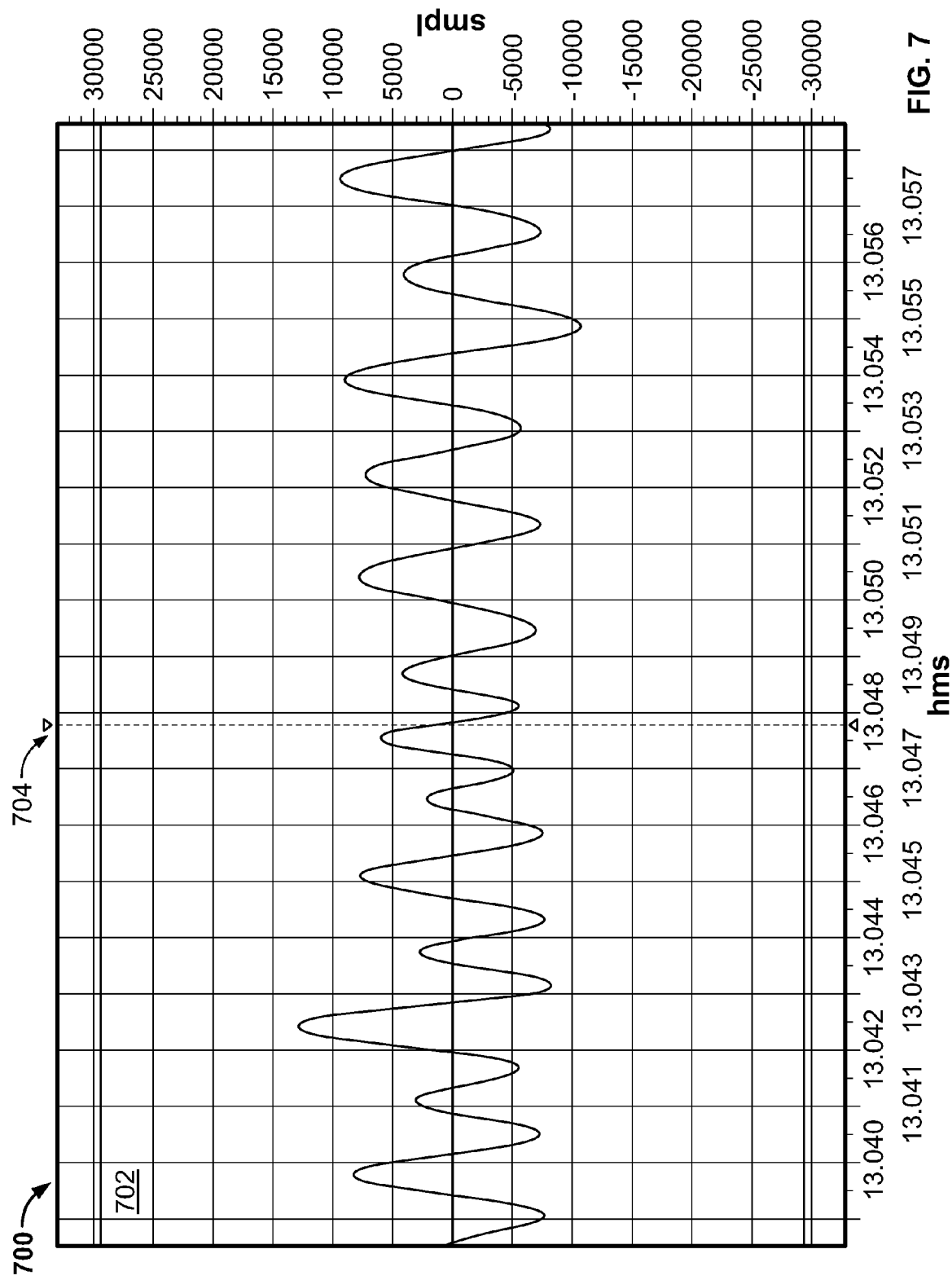
FIG. 7 shows a display of an example waveform representation of corrected edited audio data.

FIG. 7 shows a display 700 of an example waveform 702 representation of corrected edited audio data. The waveform 702 illustrates a smooth transition across edit boundary 704 where there was a discontinuity before correction (e.g., discontinuity 404 in FIG. 4). Additionally, due to the interpolation of audio data on each side of the edit boundary, the intensity of the waveform surrounding the point 704 has decreased as a result of interpolating between the audio data one each side of the discontinuity.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 8:
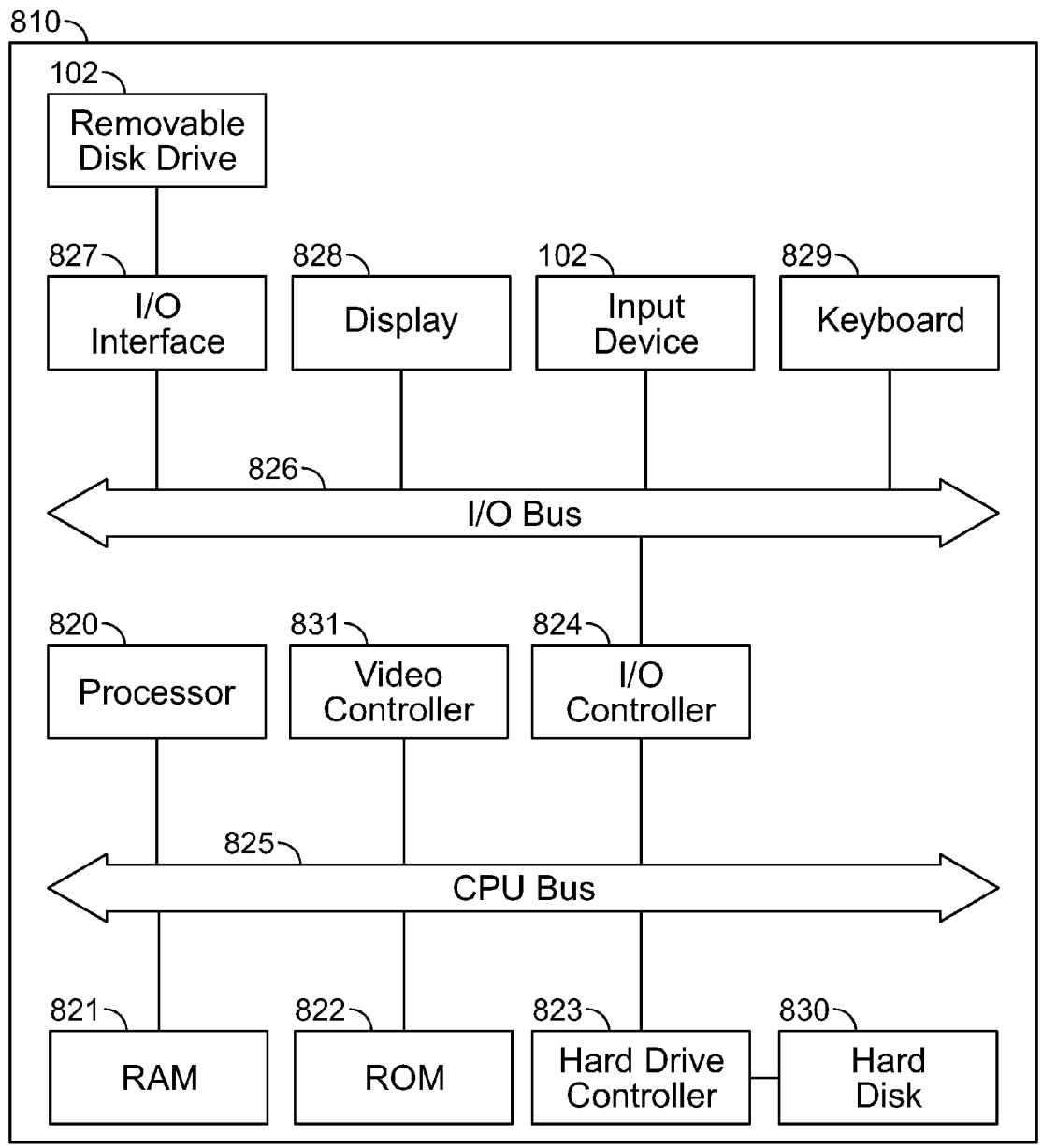
FIG. 8 shows a block diagram of an example system.

An example of one such type of computer is shown in FIG. 8, which shows a block diagram of a programmable processing system (system) 810 suitable for implementing apparatus or performing methods of various aspects of the subject matter described in this specification. The system 810 includes a processor 820, a random access memory (RAM) 821, a program memory 822 (for example, a writable read-only memory (ROM) such as a flash ROM), a hard drive controller 823, a video controller 831, and an input/output (I/O) controller 824 coupled by a processor (CPU) bus 825. The system 810 can be preprogrammed, in ROM, for example, or it can be programmed (and reprogrammed) by loading a program from another source (for example, from a floppy disk, a CD-ROM, or another computer).

The hard drive controller 823 is coupled to a hard disk 830 suitable for storing executable computer programs, including programs embodying aspects of the subject matter described in this specification.

The I/O controller 824 is coupled by means of an I/O bus 826 to an I/O interface 827. The I/O interface 827 receives and transmits data (e.g., stills, pictures, movies, and animations for importing into a composition) in analog or digital form over communication links such as a serial link, local area network, wireless link, and parallel link.

Also coupled to the I/O bus 826 is a display 828 and an input device 829 (e.g., a keyboard or a mouse). Alternatively, separate connections (separate buses) can be used for the I/O interface 827, display 828, and input device 829.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving digital audio data;
   identifying a modification to a portion of the digital audio data, the modification being in response to a user input to edit the portion of audio data; and
   automatically correcting audio data surrounding one or more edit boundaries resulting from the identified modification, wherein automatically correcting the audio data comprises:
   identifying a region associated with the one or more edit boundaries, the region being identified at least in part by identifying a specified number of samples prior to a first edit boundary and a specified number of samples after the first edit boundary,
   identifying a plurality of frequency bands in the region, and
   interpolating audio data from the region associated with the one or more edit boundaries, the interpolating including separately interpolating amplitude values for audio data across the region for each of individual frequency band.

2. The method of claim 1, where interpolating a first frequency band includes:
   identifying one or more first amplitude values associated with the audio data in the samples prior to the first edit boundary and that correspond to the first frequency band;

identifying one or more second amplitude values associated with the audio data in the samples prior to the first edit boundary and that correspond to the first frequency band; and interpolating across the region of the audio data at that frequency band using the first amplitude and the second amplitude values.

3. The method of claim 1, where interpolating a first frequency band includes:

identifying one or more first phase values associated with the audio data in the samples prior to the first edit boundary and that correspond to the first frequency band;

identifying one or more second phase values associated with the audio data in the samples prior to the first edit boundary and that correspond to the first frequency band; and interpolating across the region of the audio data at that frequency band using the first phase and the second phase values.

4. The method of claim 1, where identifying a modification to a portion of the digital audio data includes determining when an editing effect is applied to the audio data.

5. The method of claim 1, where identifying a modification to a portion of the digital audio data includes identifying a discontinuity in the audio data.

6. The method of claim 1, further comprising storing the corrected audio data.

7. A computer program product, encoded on a non-transitory computer-readable medium, operable to cause data processing apparatus to perform operations comprising:

receiving digital audio data;

identifying a modification to a portion of the digital audio data, the modification being in response to a user input to edit the portion of audio data; and automatically correcting audio data surrounding one or more edit boundaries resulting from the identified modification, wherein automatically correcting the audio data comprises:

identifying a region including a specified number of samples prior to a first edit boundary and a specified number of samples after the first edit boundary, identifying a plurality of frequency bands in the region, and interpolating audio data from the region associated with the one or more edit boundaries, the interpolating including separately interpolating amplitude values for audio data across the region for each individual frequency band.

8. The computer program product of claim 7, where interpolating a first frequency band includes:

identifying one or more first amplitude values associated with the audio data in the samples prior to the first edit boundary and that correspond to the first frequency band;

identifying one or more second amplitude values associated with the audio data in the samples prior to the first edit boundary and that correspond to the first frequency band; and interpolating across the region of the audio data at that frequency band using the first amplitude and the second amplitude values.

9. The computer program product of claim 7, where interpolating a first frequency band includes:

identifying one or more first phase values associated with the audio data in the samples prior to the first edit boundary and that correspond to the first frequency band;

identifying one or more second phase values associated with the audio data in the samples prior to the first edit boundary and that correspond to the first frequency band; and interpolating across the region of the audio data at that frequency band using the first phase and the second phase values.

10. The computer program product of claim 7, where identifying a modification to a portion of the digital audio data includes determining when an editing effect is applied to the audio data.

11. The computer program product of claim 7, where identifying a modification to a portion of the digital audio data includes identifying a discontinuity in the audio data.

12. The computer program product of claim 7, further comprising storing the corrected audio data.

13. A system comprising:

a user interface device; and one or more computers operable to interact with the user interface device and to perform operations including:

receiving digital audio data;

identifying a modification to a portion of the digital audio data, the modification being in response to a user input to edit the portion of audio data; and automatically correcting audio data surrounding one or more edit boundaries resulting from the identified modification including interpolating audio data from a region associated with the one or more edit boundaries, the interpolating including separately interpolating amplitude values for audio data across the region for each of a plurality of frequency bands, wherein automatically correcting the audio data further comprises:

identifying the region including identifying a specified number of samples prior to a first edit boundary and a specified number of samples after the first edit boundary, identifying the plurality of frequency bands in the region; and interpolating across the region for each individual frequency band.

14. The system of claim 13, where interpolating a first frequency band includes:

identifying one or more first amplitude values associated with the audio data in the samples prior to the first edit boundary and that correspond to the first frequency band;

identifying one or more second amplitude values associated with the audio data in the samples prior to the first edit boundary and that correspond to the first frequency band; and interpolating across the region of the audio data at that frequency band using the first amplitude and the second amplitude values.

15. The system of claim 13, where interpolating a first frequency band includes:

identifying one or more first phase values associated with the audio data in the samples prior to the first edit boundary and that correspond to the first frequency band;

identifying one or more second phase values associated with the audio data in the samples prior to the first edit boundary and that correspond to the first frequency band; and interpolating across the region of the audio data at that frequency band using the first phase and the second phase values.

16. The system of claim 13, where identifying a modification to a portion of the digital audio data includes determining when an editing effect is applied to the audio data.

17. The system of claim 13, where identifying a modification to a portion of the digital audio data includes identifying a discontinuity in the audio data.

18. The system of claim 13, further comprising storing the corrected audio data.

19. A system comprising:
one or more computing devices operable to perform operation
comprising: receiving digital audio data;
identifying a modification to a portion of the digital audio data, the identifying a modification including receiving a user input selecting the portion of the digital audio data and modifying the portion of the digital audio data in response to a user input specifying one or more editing operations;
means for automatically correcting audio data surrounding one or more edit boundaries resulting from the identified modification including interpolating audio data from a region associated with the one or more edit boundaries, the interpolating including separately interpolating amplitude values for audio data across the region for each of a plurality of frequency bands, wherein automatically correcting the audio data further comprises:
identifying the region including identifying a specified number of samples prior to a first edit boundary and a specified number of samples after the first edit boundary,
identifying the plurality of frequency bands in the region; and
interpolating across the region for each individual frequency band; and
wherein, the audio data is made available for further processing.

20. The system of claim 19, where interpolating a first frequency band includes: identifying one or more first amplitude values associated with the audio data in the samples prior to the first edit boundary and that correspond to the first frequency band; identifying one or more second amplitude values associated with the audio data in the samples prior to the first edit boundary and that correspond to the first frequency band; and interpolating across the region of the audio data at that frequency band using the first amplitude and the second amplitude values.

21. The system of claim 19, where interpolating a first frequency band includes:
identifying one or more first phase values associated with the audio data in the samples prior to the first edit boundary and that correspond to the first frequency band;
identifying one or more second phase values associated with the audio data in the samples prior to the first edit boundary and that correspond to the first frequency band; and
interpolating across the region of the audio data at that frequency band using the first phase and the second phase values.

22. The method of claim 1, further comprising:
displaying a visual representation of the audio data;
receiving a user input selecting a portion of the audio data in the displayed visual representation; and
receiving a user input of an editing effect to be applied to the selected portion of the audio data, the editing effect resulting in the identified modification.

23. The computer program product of claim 7, further operable to perform operations comprising:
displaying a visual representation of the audio data;
receiving a user input selecting a portion of the audio data in the displayed visual representation; and
receiving a user input of an editing effect to be applied to the selected portion of the audio data, the editing effect resulting in the identified modification.

24. The system of claim 13, further operable to perform operations comprising:
displaying a visual representation of the audio data;
receiving a user input selecting a portion of the audio data in the displayed visual representation; and
receiving a user input of an editing effect to be applied to the selected portion of the audio data, the editing effect resulting in the identified modification.

* * * * *